United States Patent
Bang

(10) Patent No.: US 9,643,680 B2
(45) Date of Patent: May 9, 2017

(54) FOLDING STRUCTURE FOR TWO-WHEELED VEHICLE

(75) Inventor: Young Bong Bang, Seoul (KR)

(73) Assignee: ADVANCED INSTITUTES OF CONVERGENCE TECHNOLOGY, Suwon-si, Gyeonggi-Do (KR)

( * ) Notice: Subject to any disclaimer, the term of this patent is extended or adjusted under 35 U.S.C. 154(b) by 10 days.

(21) Appl. No.: 14/390,788

(22) PCT Filed: Apr. 9, 2012

(86) PCT No.: PCT/KR2012/002690
§ 371 (c)(1),
(2), (4) Date: Oct. 5, 2014

(87) PCT Pub. No.: WO2013/151198
PCT Pub. Date: Oct. 10, 2013

(65) Prior Publication Data
US 2015/0061248 A1    Mar. 5, 2015

(30) Foreign Application Priority Data

Apr. 6, 2012 (KR) .................. 10-2012-0036009

(51) Int. Cl.
B62K 15/00 (2006.01)
B62K 13/08 (2006.01)
B62K 3/00 (2006.01)

(52) U.S. Cl.
CPC .......... B62K 15/008 (2013.01); B62K 3/002 (2013.01)

(58) Field of Classification Search
CPC ... B62B 15/00; B62B 13/00; B62B 2015/001; B62B 2015/006; B62B 2015/008
(Continued)

(56) References Cited

U.S. PATENT DOCUMENTS 3,979,136 A * 9/1976 Lassiere .................. B62M 9/02
                                                              280/236
5,029,666 A * 7/1991 Baldoni .................. B62M 7/12
                                                              180/208
(Continued)

FOREIGN PATENT DOCUMENTS

GB         2387147 A     10/2003
JP      2006-069392 A     3/2006
(Continued)

OTHER PUBLICATIONS

International Search Report of PCT/KR2012/002690 mailed on Feb. 25, 2013 from ISA/KR.

*Primary Examiner* — J. Allen Shriver, II
*Assistant Examiner* — Travis Coolman
(74) *Attorney, Agent, or Firm* — Revolution IP, PLLC

(57) ABSTRACT

The present disclosure relates to a folding structure for two-wheeled vehicle, comprising: a front wheel; a rear wheel; a first connection rod connected to the front wheel; a second connection rod connected to the rear wheel; a first rotary shaft for rotating the first connection rod relative to the second connection rod; and a second rotary shaft for rotating the front wheel relative to the first connection rod, wherein a space is formed by means of the rotation of the first connection rod relative to the first rotary shaft and the rotation of the front wheel relative to the second rotary shaft so as to allow the first connection rod and the second connection rod to be placed between the front wheel and the rear wheel.

11 Claims, 17 Drawing Sheets

(58) Field of Classification Search
USPC .................................. 280/287, 278; 180/208
See application file for complete search history.

(56) References Cited

U.S. PATENT DOCUMENTS

| | | | | |
|---|---|---|---|---|
| 5,398,955 A * | 3/1995 | Yeh ................................ | | 280/287 |
| 5,590,895 A * | 1/1997 | Hiramoto ............. | B62K 15/006 | |
| | | | | 280/278 |
| 5,836,602 A * | 11/1998 | Wang ............................. | | 280/287 |
| 6,336,649 B1 * | 1/2002 | Lin ................................ | | 280/278 |
| 6,641,159 B1 * | 11/2003 | Fan ...................... | B62K 15/008 | |
| | | | | 280/261 |
| 6,659,487 B1 * | 12/2003 | Raco ..................... | B62K 25/04 | |
| | | | | 280/275 |
| 6,702,312 B1 * | 3/2004 | Miksik ........................... | | 280/287 |
| 7,232,143 B1 * | 6/2007 | Ferguson ...................... | | 280/278 |
| 7,510,202 B1 * | 3/2009 | Shiao .................... | B62K 15/006 | |
| | | | | 280/278 |
| 8,162,345 B1 * | 4/2012 | Szu-Yao .............. | B62K 15/008 | |
| | | | | 280/278 |
| 8,205,902 B2 * | 6/2012 | Uimonen et al. ............. | | 280/278 |
| 8,430,414 B1 * | 4/2013 | Yap ................................ | | 280/278 |
| 8,720,918 B2 * | 5/2014 | Liao ...................... | B62K 3/002 | |
| | | | | 280/287 |
| 8,789,840 B2 * | 7/2014 | Priest et al. ................... | | 280/278 |
| 8,882,124 B2 * | 11/2014 | Yap ................................ | | 280/278 |
| 8,894,084 B1 * | 11/2014 | Yap ................................ | | 280/278 |
| 2005/0116441 A1 * | 6/2005 | Chang .................... | B62K 15/00 | |
| | | | | 280/278 |
| 2005/0285366 A1 * | 12/2005 | Huang ................. | B62K 15/006 | |
| | | | | 280/278 |
| 2006/0175797 A1 * | 8/2006 | Sanders ......................... | | 280/287 |
| 2007/0273126 A1 * | 11/2007 | Pourias ................ | B62K 15/008 | |
| | | | | 280/287 |
| 2008/0061529 A1 * | 3/2008 | Schmautz ................ | B62J 25/00 | |
| | | | | 280/291 |
| 2008/0224441 A1 * | 9/2008 | Lu ................................. | | 280/278 |
| 2011/0025016 A1 * | 2/2011 | Waaijer ......................... | | 280/287 |

FOREIGN PATENT DOCUMENTS

| | | |
|---|---|---|
| JP | 2010-285116 A | 12/2010 |
| KR | 20-1988-0016204 U | 10/1988 |
| KR | 10-0792059 B1 | 1/2008 |

* cited by examiner

FOLDING STRUCTURE FOR TWO-WHEELED VEHICLE

CROSS REFERENCE TO PRIOR APPLICATIONS

This application is a National Stage Application of PCT International Patent Application No. PCT/KR2012/002690 filed on Apr. 9, 2012, under 35 U.S.C. §371, which claims priority to Korean Patent Application No. 10-2012-0036009 filed on Apr. 6, 2012, which are all hereby incorporated by reference in their entirety.

TECHNICAL FIELD

The present invention relates to a folding structure for a two-wheeled vehicle, and more particularly, to a folding structure for a two-wheeled vehicle that is capable of being folded to have a small size and also being easily pulled. Here, the two-wheeled vehicle includes a bike such as a scooter or a bicycle.

BACKGROUND ART

This section provides background information related to the present disclosure which is not necessarily prior art.

FIG. 1 is a view illustrating one example of a conventional folding structure for a two-wheeled vehicle. In the two-wheeled vehicle, a seat part 100 and a handle part 200 are simply folded to be transportable. This folding structure has a very large volume even after the folding, and thus it is difficult to transport.

FIG. 2 is a view illustrating another example of the conventional folding structure. In the two-wheeled vehicle, the seat part 100 is slid to a center side, the handle part 200 is rotated, and then a rear wheel 300 is folded to be transportable.

FIG. 3 is a view illustrating still another example of the conventional folding structure. The two-wheeled vehicle includes the seat part 100, the handle part 200, the rear wheel 300, a front wheel 400, a rear wheel receiving part 310 and a front wheel receiving part 410. The rear wheel 300 is received in the rear wheel receiving part 310, the front wheel 400 is received in the front wheel receiving part 410, and the seat part 100 and the handle part 200 are folded. The two-wheeled vehicle may be compactly folded, but also has a disadvantage that the rear wheel 300 and the front wheel 400 may not be used when the vehicle moves.

DISCLOSURE

Technical Problem

This section will be described at the rear side of the modes of the invention.

Technical Solution

This section provides a general summary of the disclosure and is not a comprehensive disclosure of its full scope or all of its features.

According to one aspect of the present disclosure, a folding structure for a two-wheeled vehicle includes a front wheel and a rear wheel; a first connection rod connected with the front wheel; a second connection rod connected with the rear wheel; a first rotational shaft configured to rotate the first connection rod with respect to the second connection rod; and a second rotational shaft configured to rotate the front wheel with respect to the first connection rod, wherein a space in which the first and second connection rods are located is formed between the front and rear wheels by rotation of the first connection rod with respect to the first rotational shaft and rotation of the front wheel with respect to the second rotational shaft.

Advantageous Effects

This section will be described at the rear side of the modes of the invention.

MODES OF THE INVENTION

The present disclosure will be described in detail with reference to the accompanying drawings.

Figure 1:
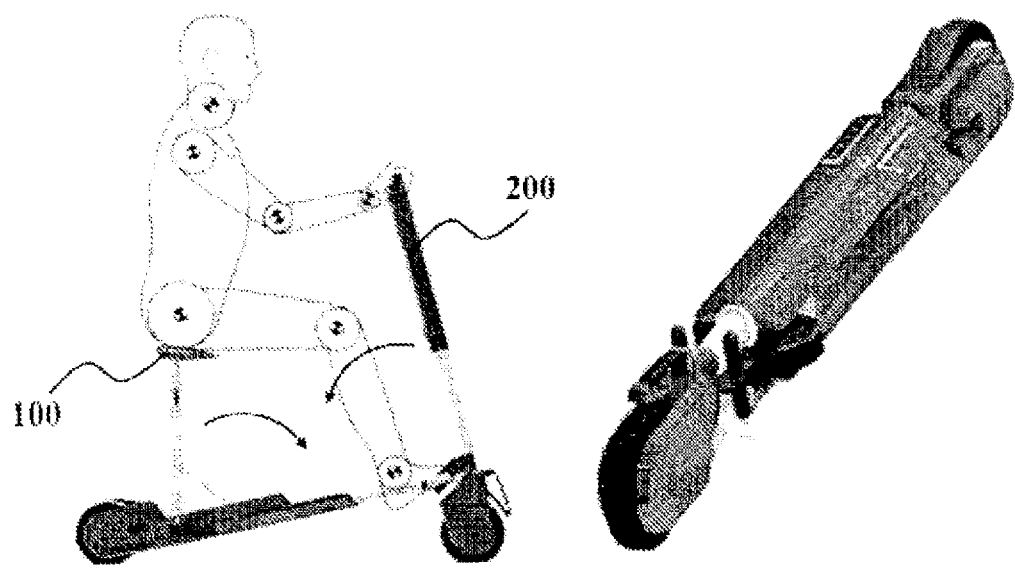
FIG. 1 is a view illustrating one example of a conventional folding structure for a two-wheeled vehicle.
Figure 2:
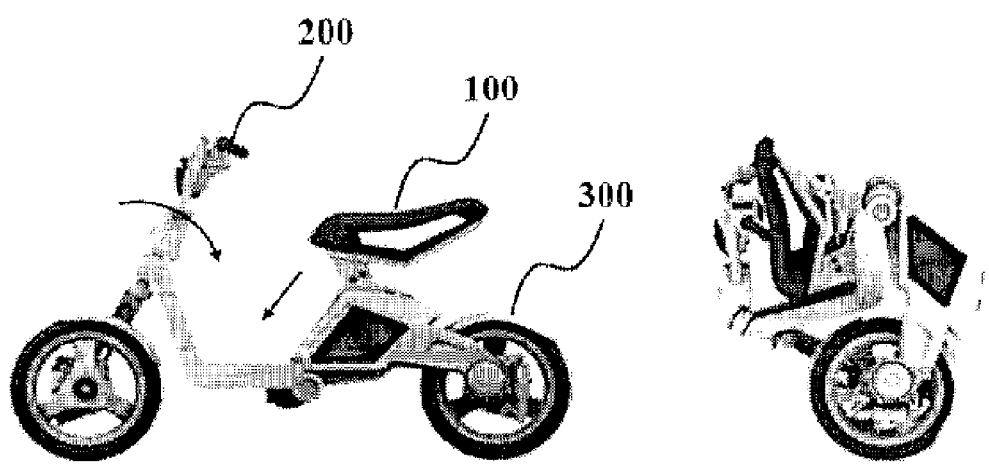
FIG. 2 is a view illustrating another example of a conventional folding structure for a two-wheeled vehicle.
Figure 3:
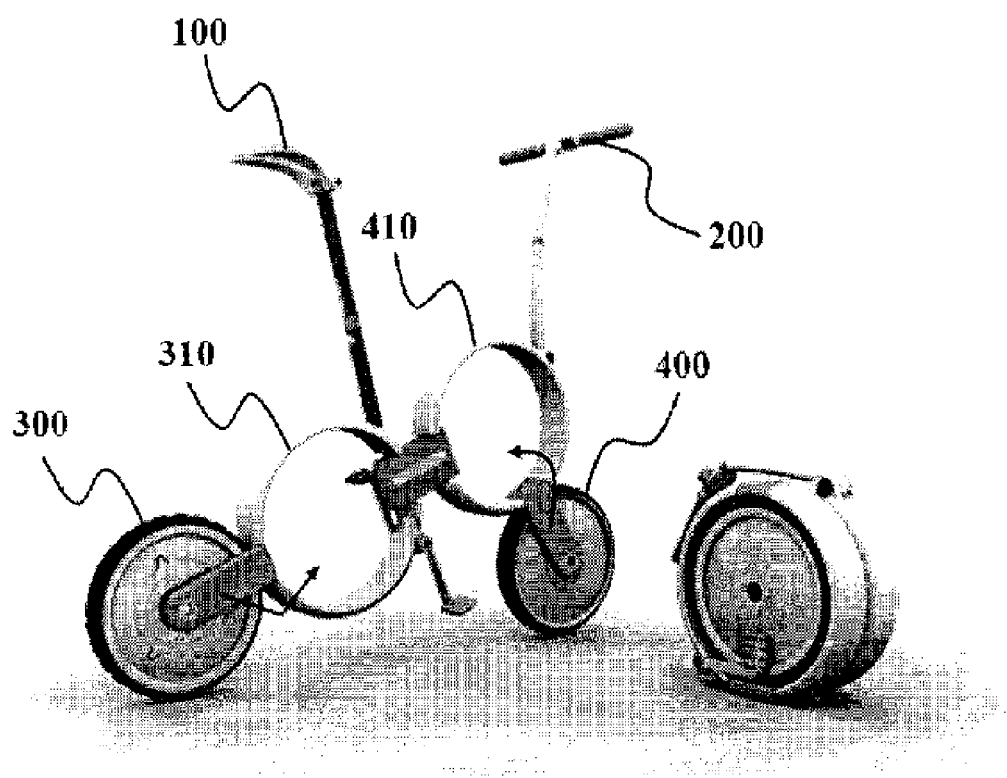
FIG. 3 is a view illustrating still another example of a conventional folding structure for a two-wheeled vehicle.
Figure 4:
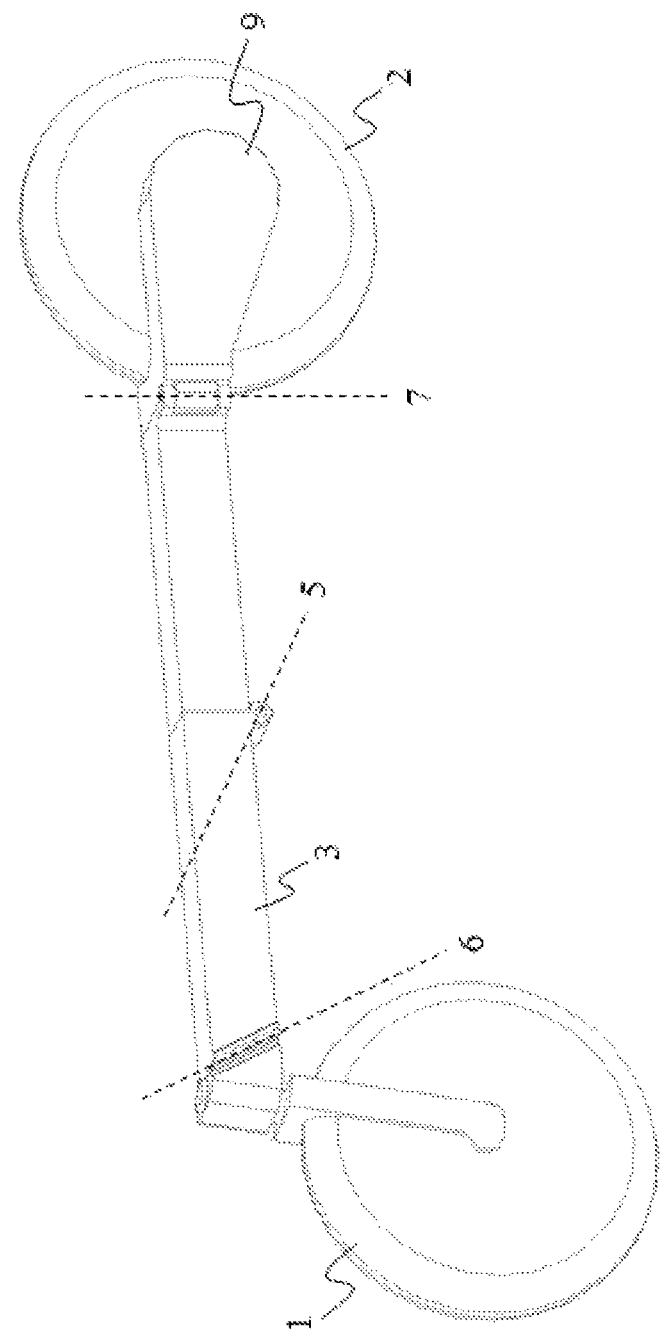
FIG. 4 is a conceptual view illustrating one example of a folding structure for a two-wheeled vehicle according to present disclosure.

FIG. 4 is a conceptual view illustrating one example of a folding structure for a two-wheeled vehicle according to present disclosure. The two-wheeled vehicle includes a front wheel 1, a rear wheel 2, and connection rods 3', 3 and 4 which connect the front wheel 1 and the rear wheel 2. The connection rods 3 and 4 are relatively rotatable about a rotational shaft 5. The front wheel 1 is rotatable about a rotational shaft 6 in a clockwise direction with respect to the connection rod 3. The rear wheel 2 is rotatable about a rotational shaft 7 in a clockwise direction with respect to the connection rod 4. The front wheel 1 is rotated about the rotational shaft 6 in the clockwise direction, the rear wheel 2 is rotated about the rotational shaft 7 in the clockwise direction, and then the front wheel 1 and the connection rod 3, and the rear wheel 2 and the connection rod 4 are folded with respect to the rotational shaft 5, and thus the front and rear wheels 1 and 2 may be used as wheels when transporting the two-wheeled vehicle. Further, since a space is secured between the front and rear wheels 1 and 2, it is possible to provide stability when transporting the two-wheeled vehicle. The rotational shaft 6 is inclined with respect to the connection rod 3 so as to align centers of the front and rear wheels 1 and 2 when the rotational shaft 5 is folded. A degree of inclination of the rotational shafts 5, 6 and 7 with respect to the connection rods 3 and 4 may be changed according to conditions of the front wheel 1 and the rear wheel 2.

Figure 5:
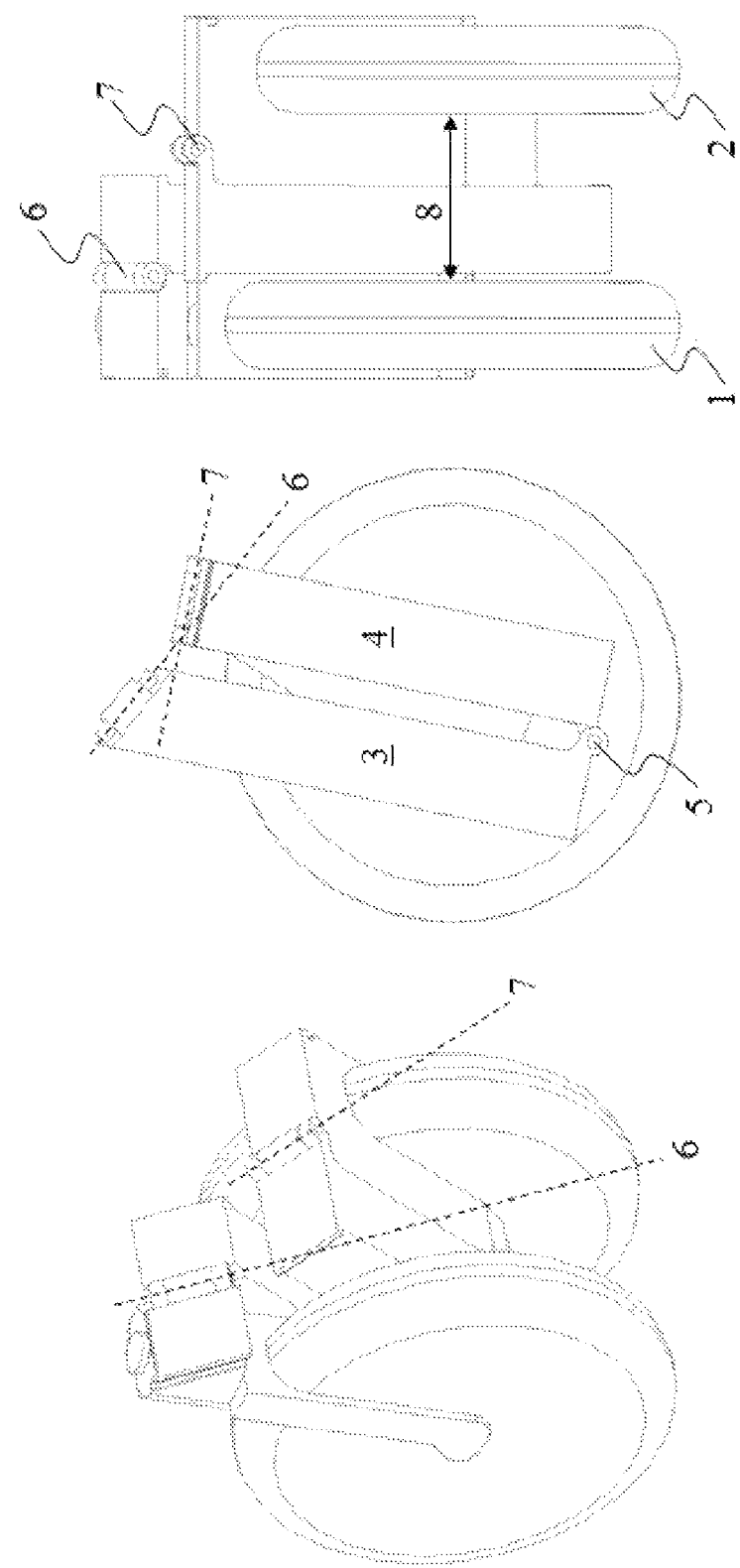
FIG. 5 is a view illustrating a folded state of the folding structure for the two-wheeled vehicle according to present disclosure.

FIG. 5 is a view illustrating a folded state of the folding structure for the two-wheeled vehicle according to the present disclosure. In the right drawing, a space 8 is generated between the front wheel 1 and the rear wheel 2. In the middle drawing, it may be understood that sides of the connection rods 3 and 4 folded with respect to the rotational shaft 5 in the space 8 are empty. Returning to FIG. 4, securing of the space 8 can be facilitated by providing a necessary volume to a supporting part 9 of the rear wheel 2. A component such as a motor may be installed in the supporting part 9 according to a design thereof.

Figure 6:
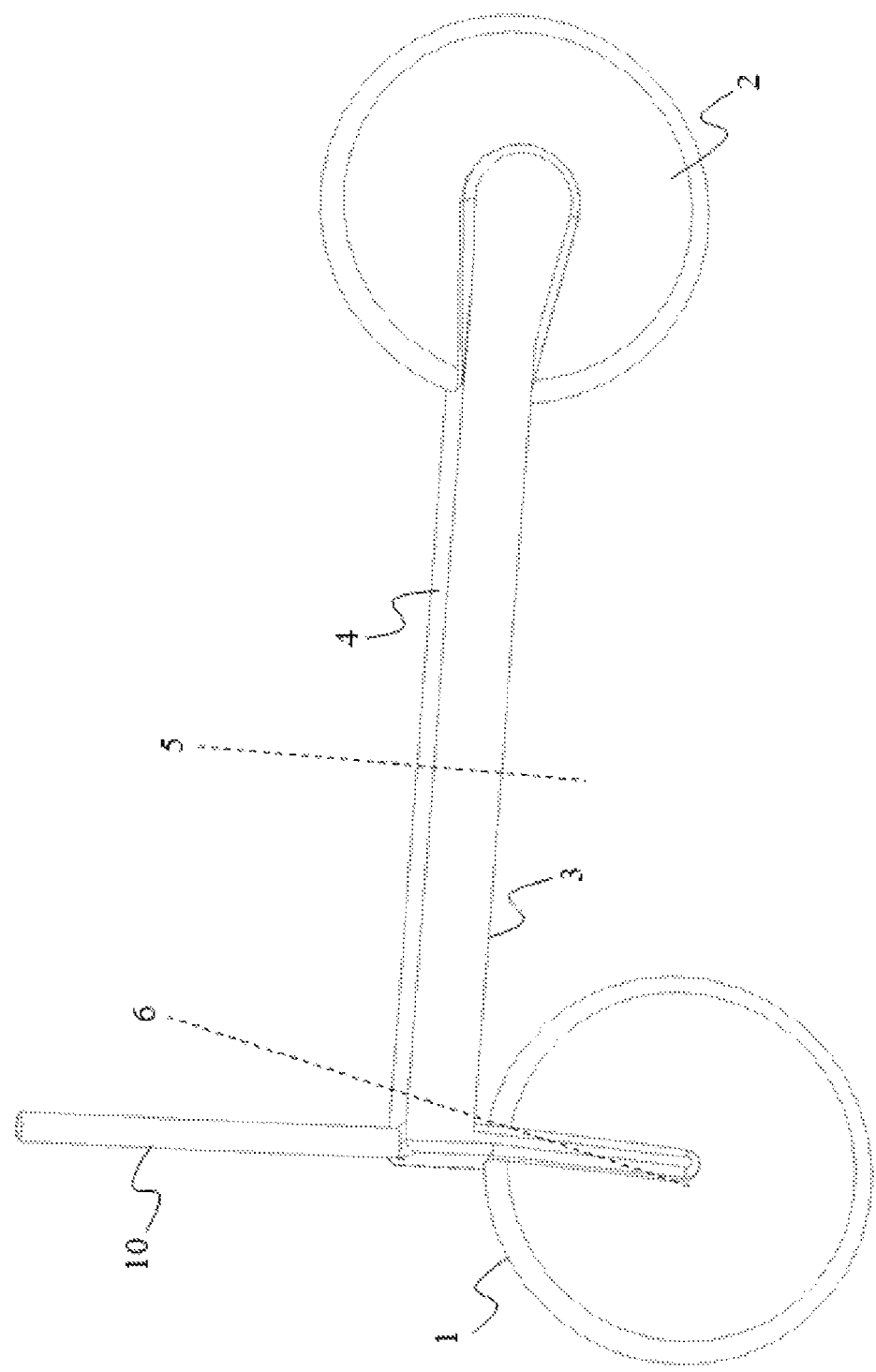
FIG. 6 is a view illustrating another example of the folding structure for the two-wheeled vehicle according to present disclosure.

FIG. 6 is a view illustrating another example of the folding structure for the two-wheeled vehicle according to present disclosure. The two-wheeled vehicle includes a front wheel 1, a rear wheel 2, and connection rods 3 and 4 which connect the front wheel 1 and the rear wheel 2. The front wheel 1 is rotatable about a rotational shaft 6 in a clockwise direction with respect to the connection rod 3. The rear wheel 2 is rotatable about a rotational shaft 5 in the clockwise direction. The rotational shaft 6 is inclined with respect to the connection rod 3 so as to align centers of the front and rear wheels 1 and 2 when the rotational shaft 5 of the rear wheel 2 is rotated. The degree of inclination of the rotational shafts 5 and 6 with respect to the connection rods 3 and 4 may be changed according to conditions of the front wheel 1 and the rear wheel 2 when transporting the two wheeled vehicle. Reference numeral 10 which has not been described is a handle part.

Figure 7:
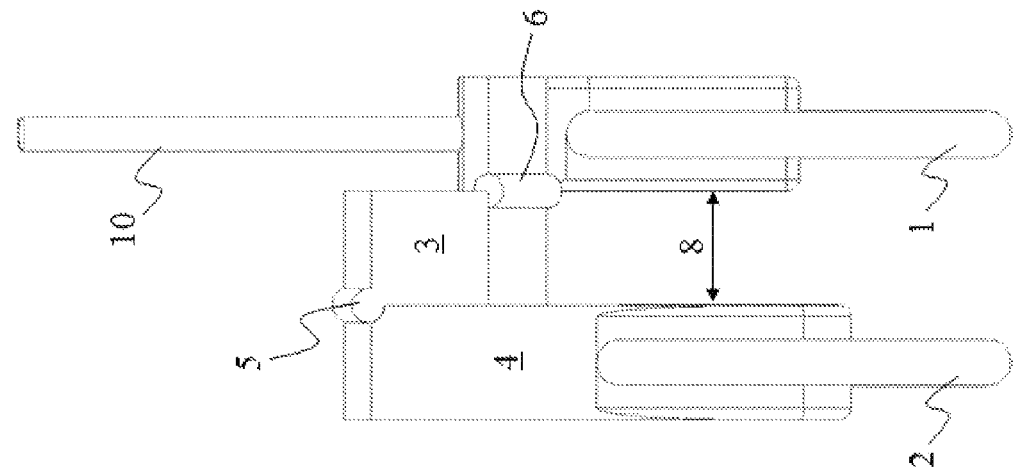
FIG. 7 is a view illustrating another folded state of the folding structure for the two-wheeled vehicle according to present disclosure.
Figure 7:
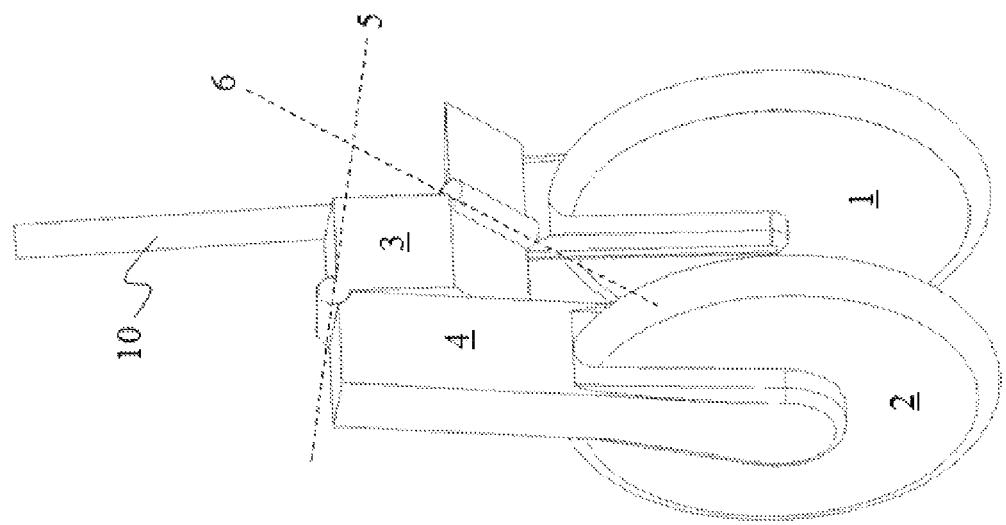

FIG. 7 is a view illustrating another folded state of the folding structure for the two-wheeled vehicle according to present disclosure. The front wheel 1 and the connection rod 3, and the rear wheel 2 and the connection rod 4 are rotated with respect to the rotational shaft 5. The front wheel 1 and the handle part 10 are rotated about the rotational shaft 6 in a counterclockwise direction with respect to the connection rod 3, and thus the space 8 is formed. The handle part 10 may serve as a handle even when the two-wheeled vehicle is transported.

Figure 8:
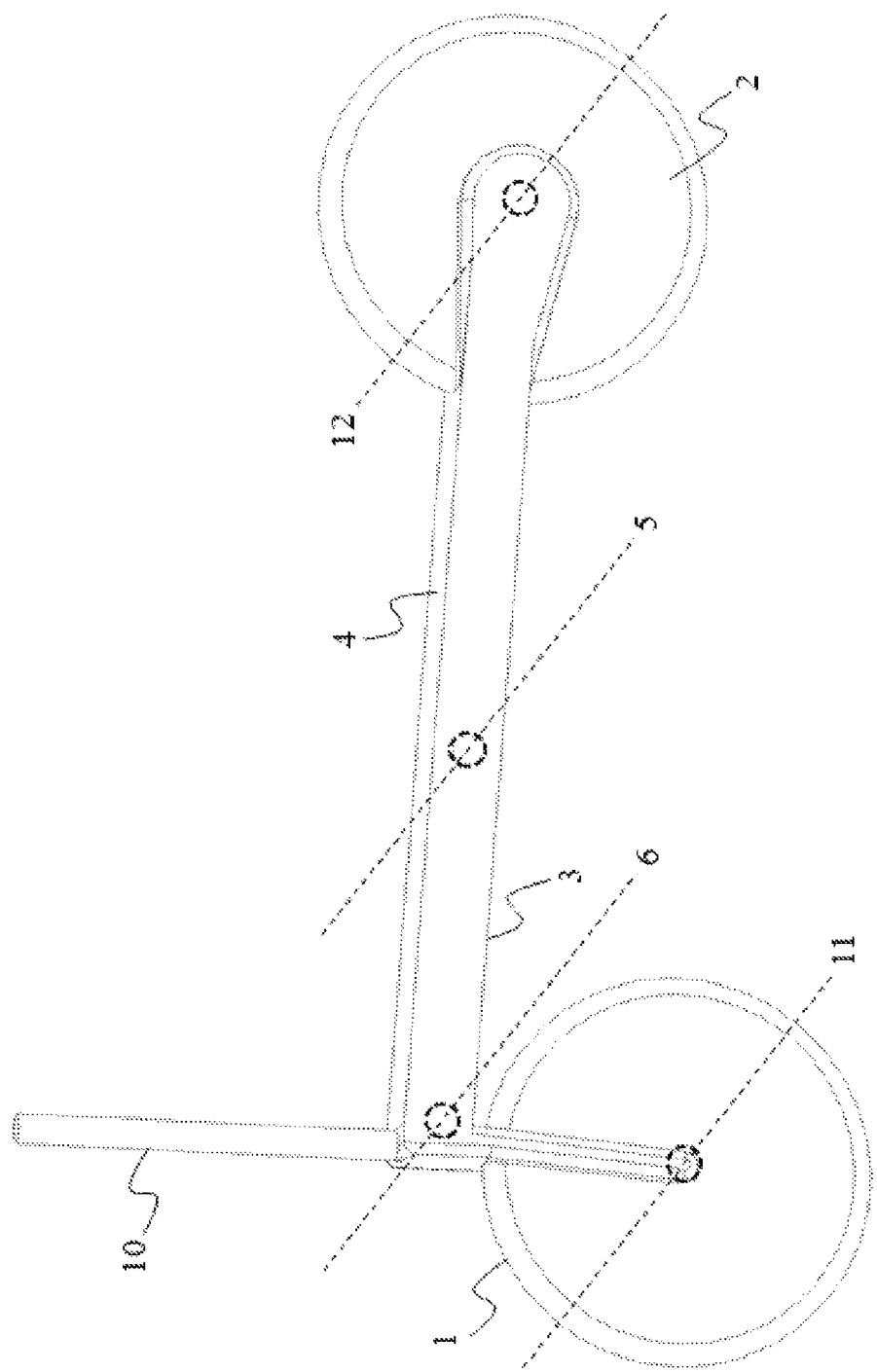
FIG. 8 is a conceptual view illustrating still another example of the folding structure for the two-wheeled vehicle according to present disclosure.

FIG. 8 is a conceptual view illustrating still another example of the folding structure for the two-wheeled vehicle according to present disclosure. The rotational shafts 5 and 6 have the same directions as a rotational shaft 11 of the front wheel 1 and a rotational shaft 12 of the rear wheel 2. In this case, when the connection rod 3 and the connection rod 4 are folded with respect to the rotational shaft 5, the front wheel 1 and the rear wheel 2 are overlapped. Therefore, in order to ensure the space 8 (referring to FIG. 5) before the connection rods 3 and 4 are folded with respect to the rotational shaft 5, a mechanism for moving a relative position of the rear wheel 2 to a side with respect to the front wheel 1 is required. This will be described in FIGS. 9 and 10. By providing the rotational shaft 6, it is possible to adjust a relative position between the connection rods 3 and 4 and the handle part 10 after the folding.

Figure 9:
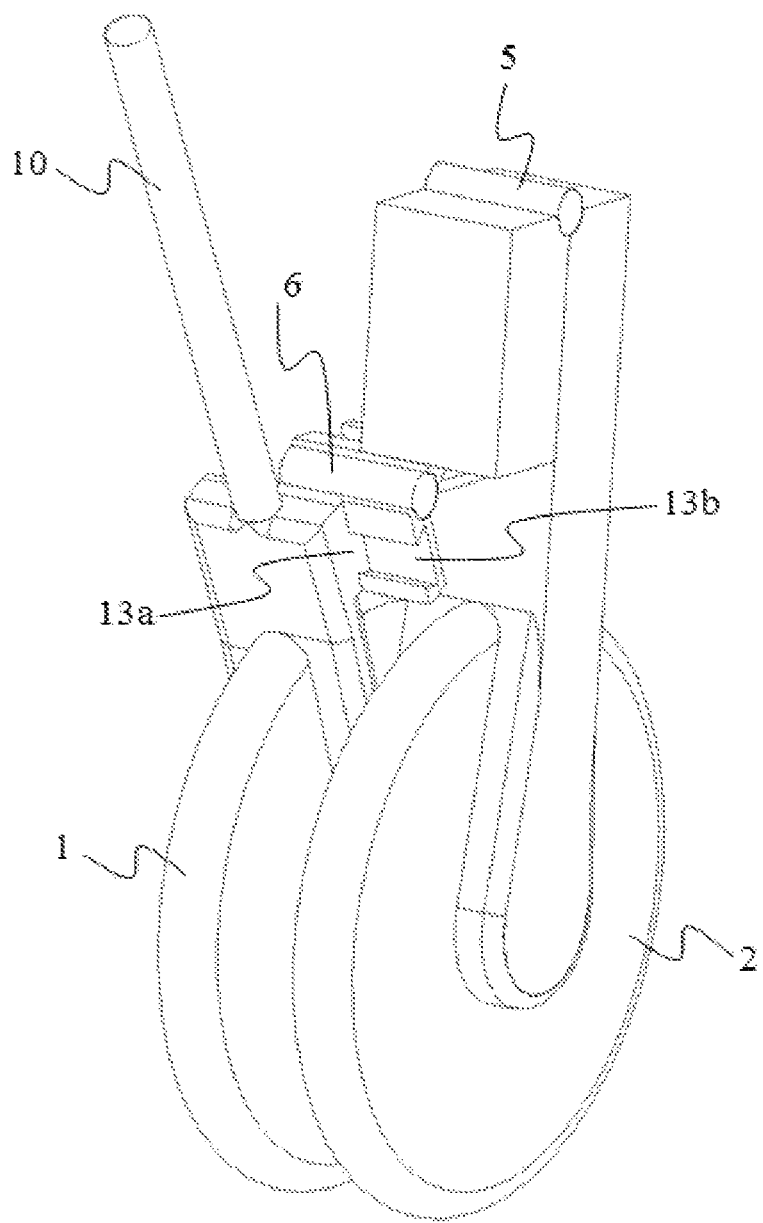
FIG. 9 is a view illustrating still another folded state of the folding structure for the two-wheeled vehicle according to present disclosure.

FIG. 9 is a view illustrating still another folded state of the folding structure for the two-wheeled vehicle according to present disclosure. The front and rear wheels 1 and 2 are folded with respect to the rotational shafts 5 and 6. A slide protrusion 13a and a slide groove 13b are provided at the rotational shaft 6 to move the relative position of the front and rear wheels 1 and 2 and thus to ensure the space. Therefore, before the rotation, the slide protrusion 13a and the slide groove 13b are moved, and thus positions of the front and rear wheels 1 and 2 are moved. After the folding using such a configuration, the space between the front and rear wheels 1 and 2 may be controlled according to a user's convenience. Reference numeral 10 which has not been described is a handle part.

Figure 10:
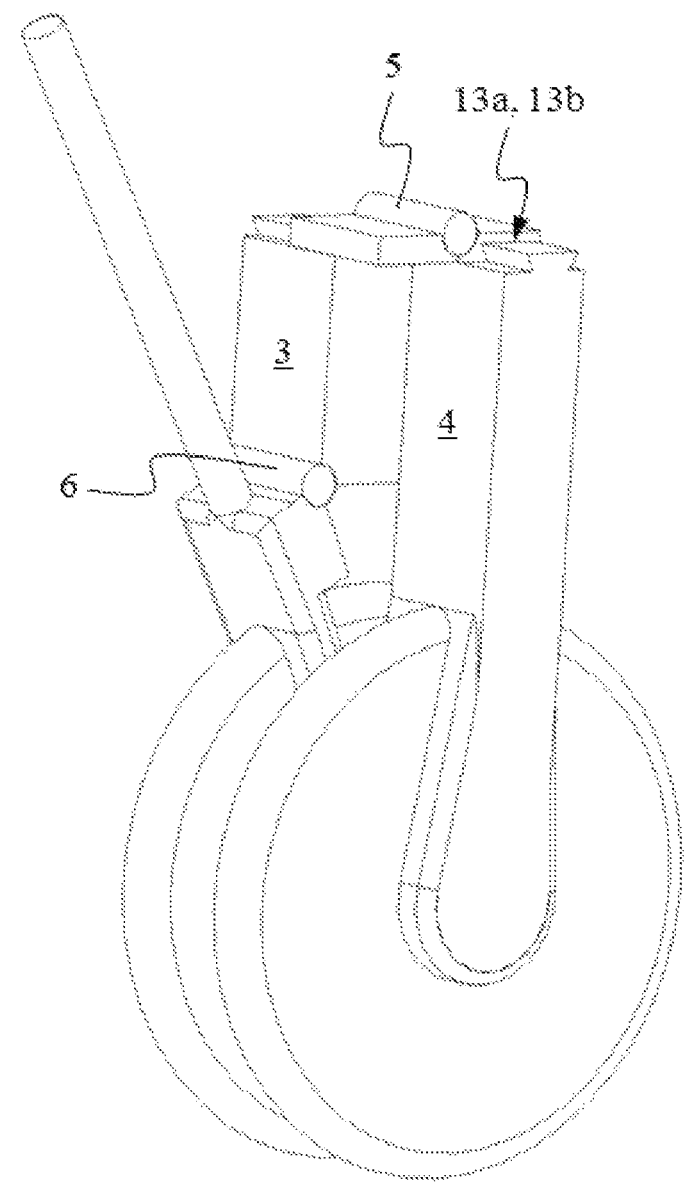
FIG. 10 is a view illustrating yet another folded state of the folding structure for the two-wheeled vehicle according to present disclosure.

FIG. 10 is a view illustrating yet another folded state of the folding structure for the two-wheeled vehicle according to present disclosure. The front and rear wheels 1 and 2 are folded with respect to the rotational shafts 5 and 6. Slide mechanisms 13a and 13b are provided at the rotational shaft 5. In FIGS. 9 and 10, a means for allowing a relative translation between the front wheel 1 and the rear wheel 2 is located adjacent to the rotational shafts 5 and 6, and may be located at other portion of the connection rods 3 and 4. However, by providing the means for allowing the relative translation together with the rotational shafts 5 and 6, the components may be simplified or integrated.

Figure 11:
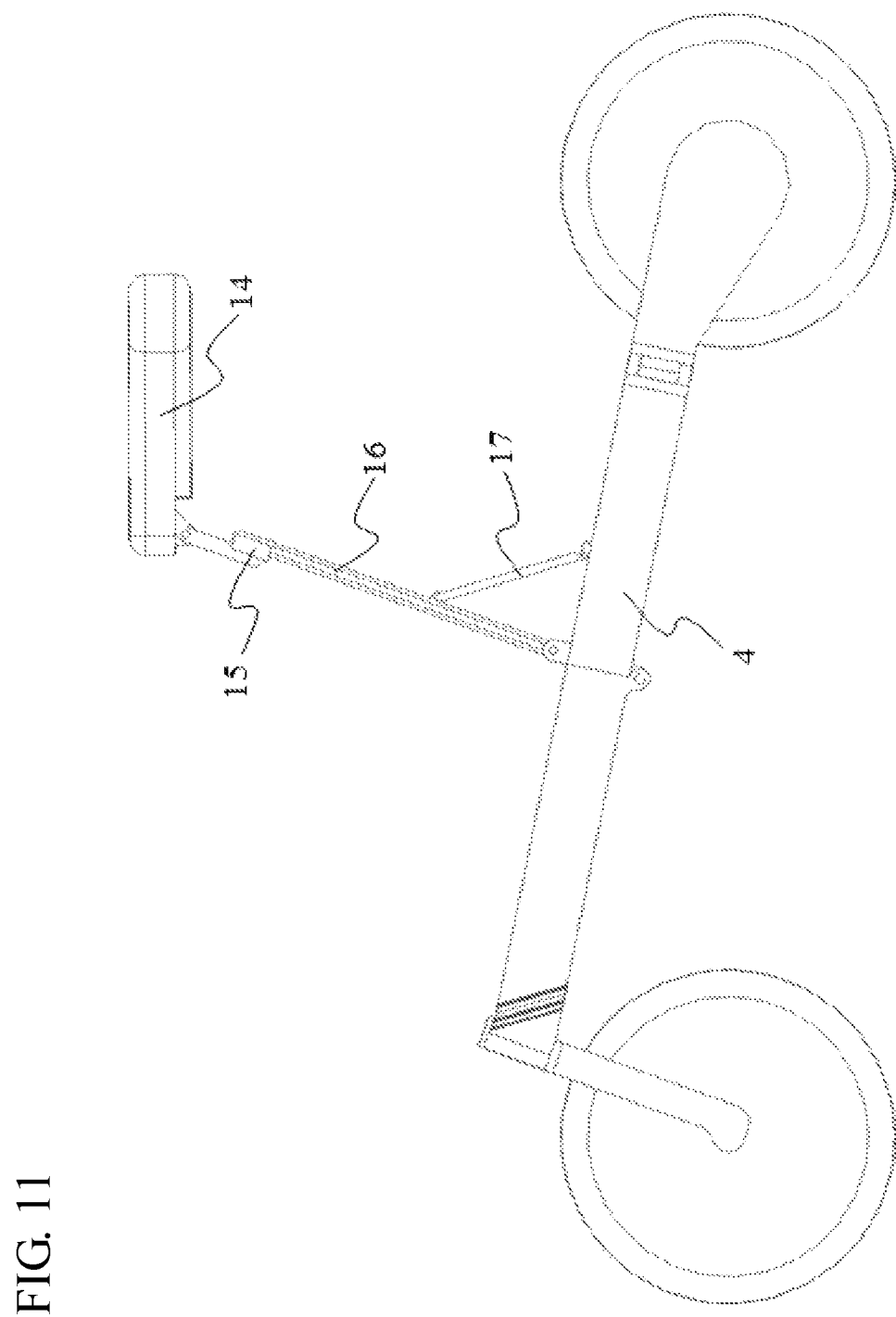
FIGS. 11 and 12 are views illustrating one example of folding a seat part.
Figure 12:
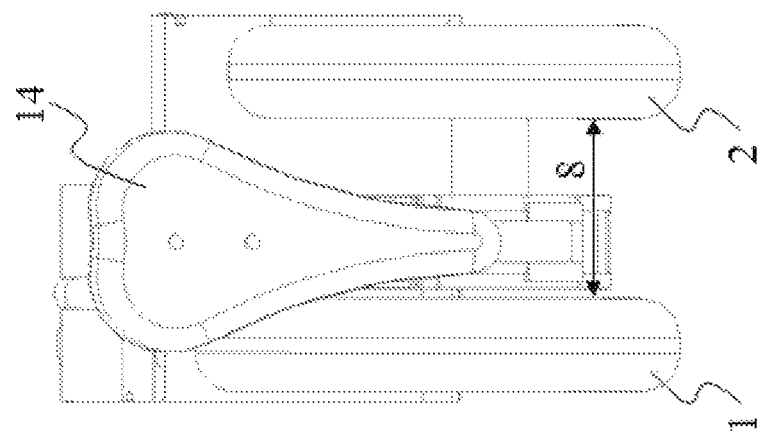
Figure 12:
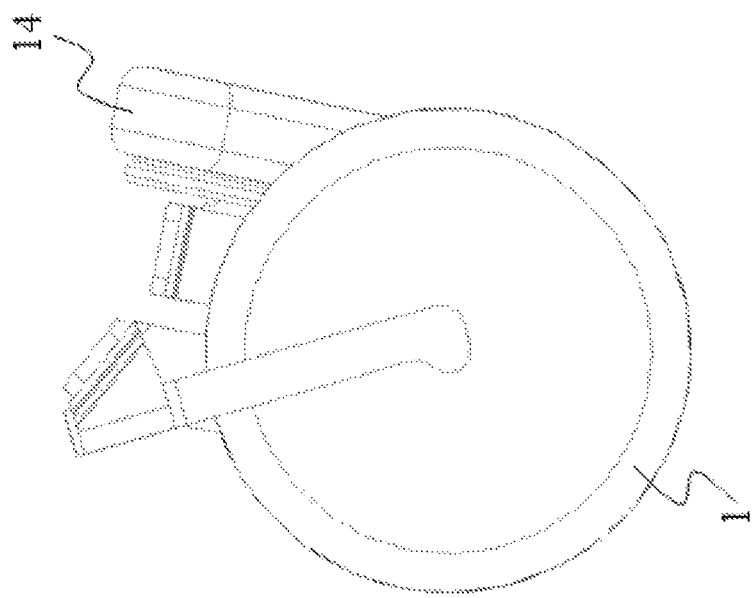

FIGS. 11 and 12 are views illustrating one example of folding a seat part. The seat part includes a seat 14, a height adjusting part 15, a supporting part 16 and a link 17. The link 17 allows the seat 14 to be located above the connection rod 4, and the seat 14 is located in the space 8 between the front and rear wheels 1 and 2, when the two-wheeled vehicle is folded.

Figure 13:
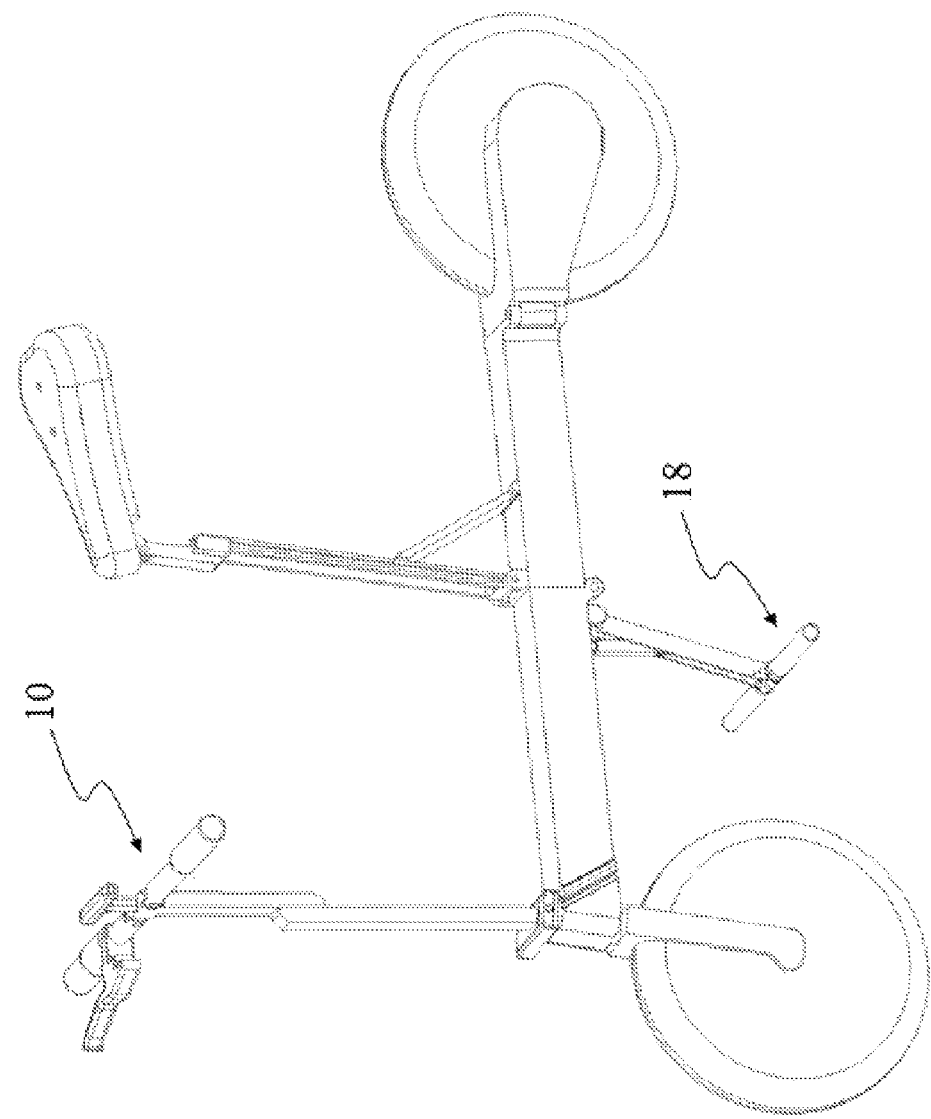
FIGS. 13 to 17 are views illustrating one example of folding a handle part, a leg-rest part and the seat part.
Figure 14:
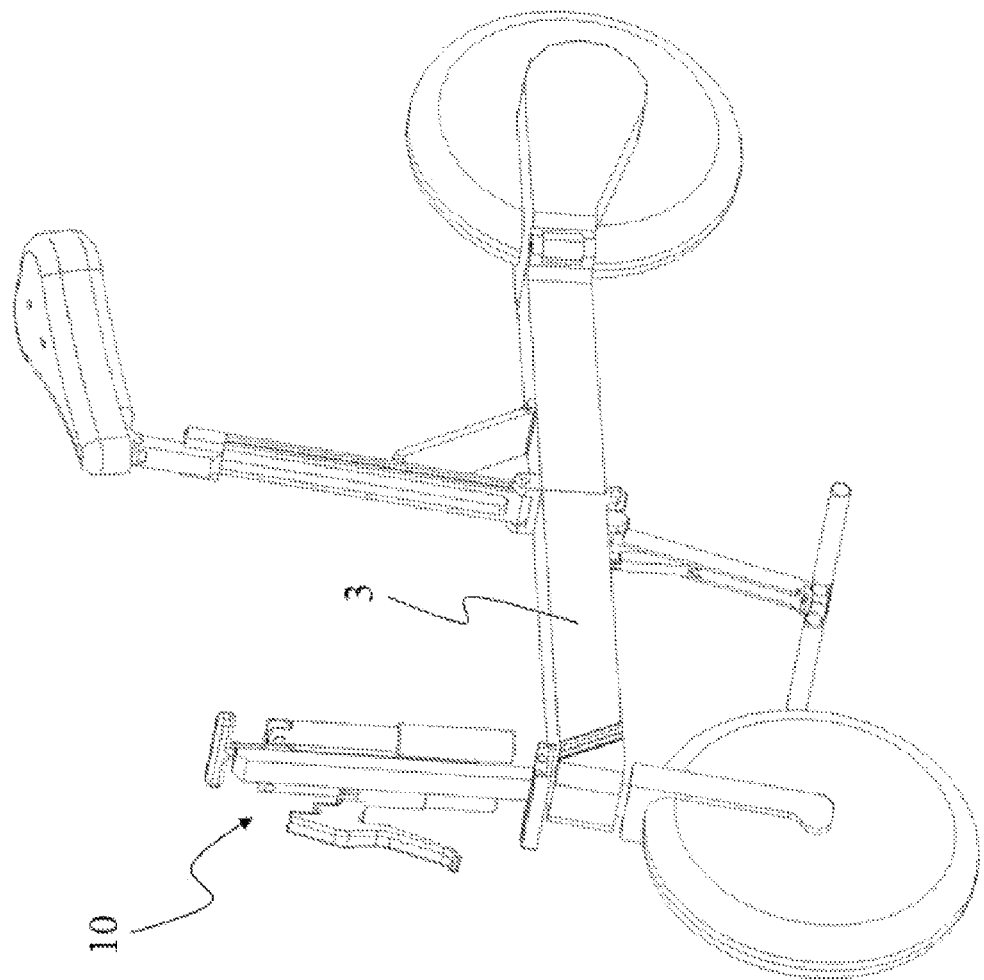
Figure 15:
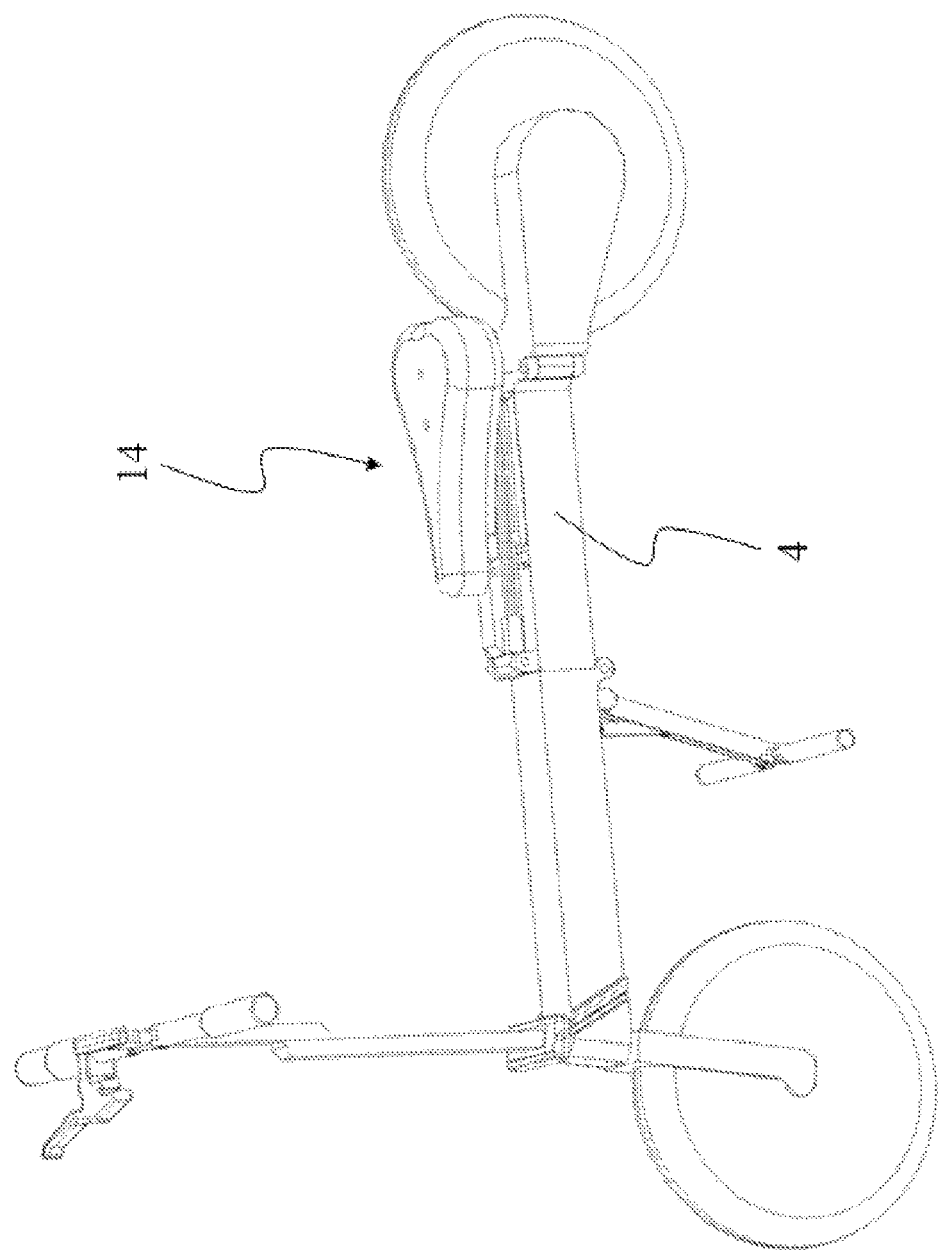
Figure 16:
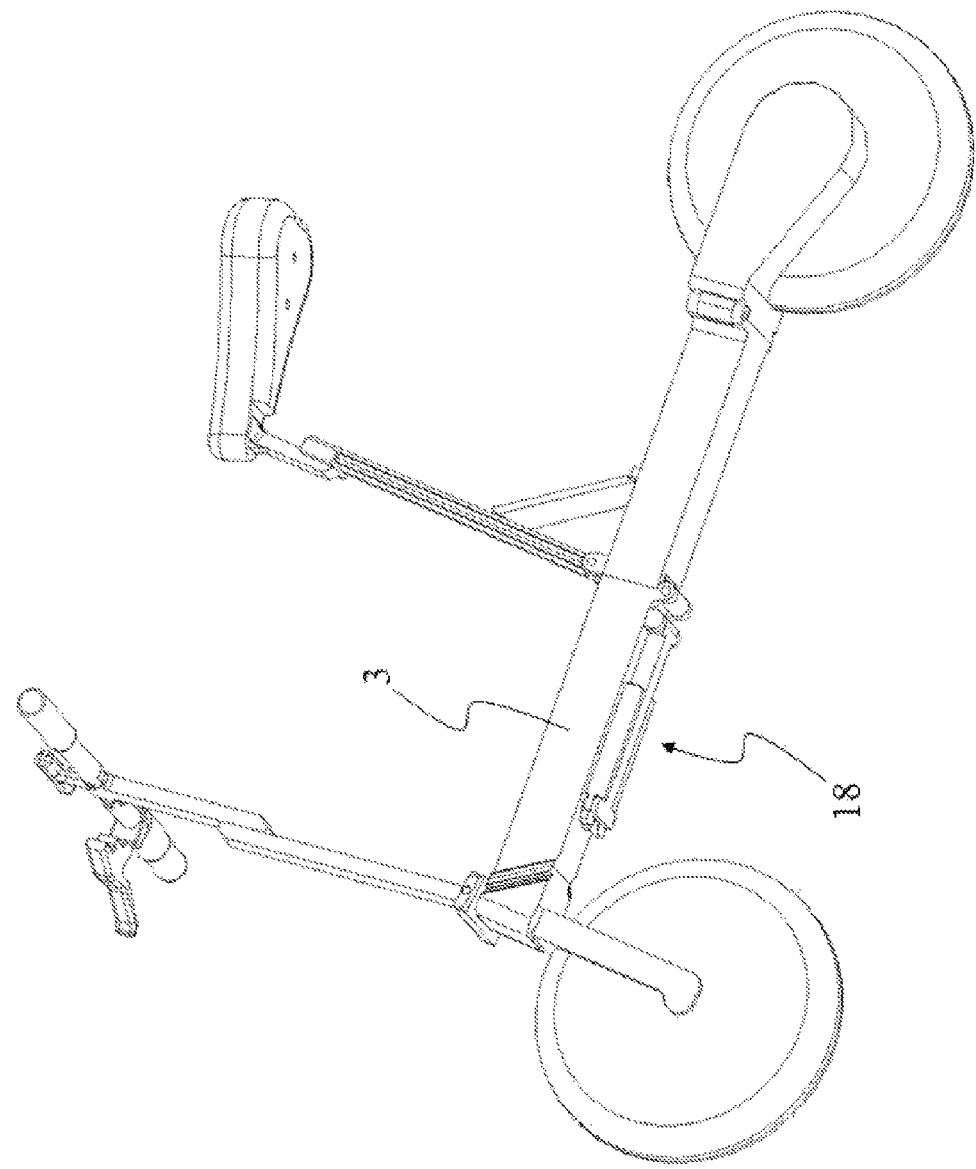
Figure 17:
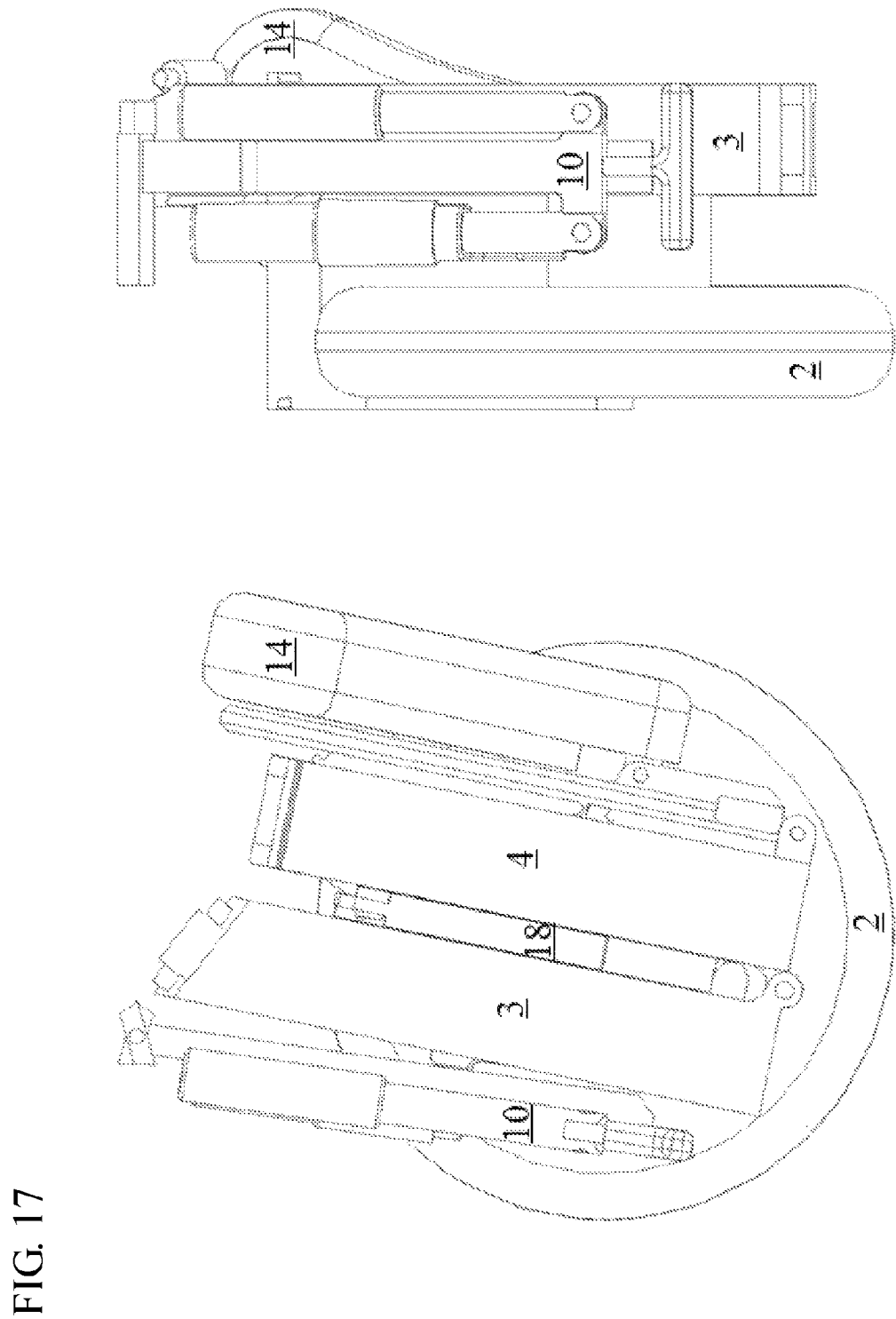

FIGS. 13 to 17 are views illustrating one example of folding a handle part, a leg-rest part and the seat part. FIG. 13 illustrates a state in which the handle part 10 and the leg-rest part 18 are unfolded, and FIG. 14 illustrates a state in which the handle part 10 is folded. In this state, the handle part 10 may be folded once more to the connection rod 3. If necessary, a slide mechanism is provided to slightly move the handle part 10 on the connection rod 3 in a vertical direction to a lengthwise direction thereof and then to fold the handle part 10. FIG. 15 illustrates a state in which the seat part 14 (even though the seat part includes reference numerals 15, 16 and 17, only reference numeral 14 is shown for the sake of convenience of the explanation) is folded to the connection rod 4. FIG. 16 illustrates a state in which the leg-rest part 18 is folded to the connection rod 3. FIG. 17 illustrates a folded state while the front wheel 1 is omitted. The connection rods 3 and 4 are disposed in parallel in the rear wheel 2, the handle part 10 is folded on the connection rod 3, the seat part 14 is folded on the connection rod 4, and the leg-rest part 18 is located between the connection rods 3 and 4.

Hereinafter, various embodiments of the present disclosure will be described.

(1) The folding structure for the two-wheeled vehicle is characterized by further including a third rotational shaft which rotates a rear wheel with respect to a second connection rod, wherein a space is defined by rotation of a first connection rod with respect to the first rotational shaft, rotation of a front wheel with respect to a second rotational shaft, and rotation of the rear wheel with respect to the third rotational shaft.

(2) The folding structure for the two-wheeled vehicle is characterized in that the rotation of the front wheel with respect to the second rotational shaft, and the rotation of the rear wheel with respect to the third rotational shaft are in the same direction.

(3) The folding structure for the two-wheeled vehicle is characterized in that the second rotational shaft is inclined with respect to the first connection rod, such that the front and rear wheels serve as wheels when the two-wheeled vehicle is folded and transported.

(4) The folding structure for the two-wheeled vehicle is further characterized by a rear wheel supporting part provided at a rear wheel side to be capable of expanding the space when the rear wheel is rotated with respect to the third rotational shaft.

(5) The folding structure for the two-wheeled vehicle is characterized in that the first rotational shaft is vertical to lengthwise directions of the first and second connection rods, and the second rotational shaft is inclined with respect to the first connection rod, such that the front and rear wheels serve as wheels when the two-wheeled vehicle is folded and transported, and the rotation with respect to the first rotational shaft and the rotation with respect to the second rotational shaft are in the same direction. The first rotational shaft can be also configured to be almost vertical to the lengthwise directions of the first and second connection rods.

(6) The folding structure for the two-wheeled vehicle is characterized in that the first and second rotational shafts have the same directions as rotational shafts of the front and rear wheels, and a means for moving a relative position of the front wheel with respect to the rear wheel so as to form the space is further included at one of the first and second connection rods. Here, those skilled in the art should understand that the same directions may not coincide with each other.

(7) The folding structure for the two-wheeled vehicle is characterized in that the means for moving the relative position of the front wheel with respect to the rear wheel is provided at the second rotational shaft side.

(8) The folding structure for the two-wheeled vehicle is characterized in that the means for moving the relative position of the front wheel with respect to the rear wheel is provided at the first rotational shaft side.

(9) The folding structure for the two-wheeled vehicle is characterized by further including a seat part, wherein at least part of the seat part is located in the space when the two-wheeled vehicle is folded.

(10) The folding structure for the two-wheeled vehicle is characterized in that at least part of the seat part is located above the second connection rod.

(11) The folding structure for the two-wheeled vehicle is characterized by further including a leg-rest part, wherein the leg-rest part is located between the first and second connection rods in the space when folded.

(12) The folding structure for the two-wheeled vehicle is characterized by further including a handle part, wherein the handle part is located above the first connection rod in the space when folded.

(13) The folding structure for the two-wheeled vehicle is characterized by further including a handle part located at the front wheel side, and a seat part located between the front and rear wheels, wherein at least part of the handle part and at least part of the seat part are located in the space when folded.

(14) The folding structure for the two-wheeled vehicle is characterized in that at least part of the handle part is located beside the first connection rod, and at least part of the seat part is located beside the second connection rod.

According to one folding structure according to the present disclosure, the two-wheeled vehicle can be easily folded.

Also, according to another folding structure according to the present disclosure, the easily folded two-wheeled vehicle can be transported.

Also, according to still another folding structure according to the present disclosure, the front and rear wheels can be used as wheels when the two-wheeled vehicle is transported.

Also, according to yet another folding structure according to the present disclosure, the wide space between the front and rear wheels can be ensured when the two-wheeled vehicle is folded, and thus the two-wheeled vehicle can be easily transported.

Also, according to yet another folding structure according to the present disclosure, the handle part, the seat part and the leg-rest part can be easily received between the front and rear wheels when the two-wheeled vehicle is folded. Further, in the case of a bicycle, a pedal can be received therebetween.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A folding structure for a two-wheeled vehicle, comprising:
    a front wheel and a rear wheel;
    one end of a head frame connected with the front wheel;
    one end of a first frame connected to the other end of the head frame;
    one end of a second frame connected to the other end of the first frame, and the other end of the second frame connected with the rear wheel;
    a first rotational shaft configured to rotate the head frame with respect to the first frame, wherein the first rotational shaft is in the perpendicular direction to the first frame;
    a second rotational shaft configured to rotate the first frame with respect to the second frame, wherein the second rotational shaft is in the perpendicular direction to the first and the second frames,
    wherein the first rotational shaft is located in an uppermost end of the first frame, and the second rotational shaft is located in lower ends of the first and the second frames,
    wherein a space is formed between the front and rear wheels when the front and rear wheels are opposite to each other by rotation of at least one of the first rotational shaft and the second rotational shaft; and
    a slide protrusion and slide groove located at the first rotational shaft or the second rotational shaft to regulate a distance of the space between the front and rear wheels in a folded configuration of the folding structure, wherein when the front and rear wheels are opposite to each other, the front wheel is beside the rear wheel.

2. The folding structure of claim 1, further comprising a seat part,
    wherein at least part of the seat part is located in the space when the two-wheeled vehicle is folded.

3. The folding structure of claim 2, wherein the at least part of the seat part is located above the second frame.

4. The folding structure of claim 1, further comprising a handle part located at the front wheel side, and a seat part located between the front and rear wheels, wherein at least part of the handle part and at least part of the seat part are located in the space when folded.

5. The folding structure of claim 4, wherein the at least part of the handle part is located beside the first frame, and the at least part of the seat part is located beside the second frame.

6. The folding structure of claim 1, further comprising a leg-rest part,
   wherein the leg-rest part is located between the first and the second frames in the space when folded.

7. The folding structure of claim 1, wherein the first and second rotational shafts have the same directions as rotational shafts of the front and rear wheels.

8. The folding structure of claim 1, further comprising a handle part,
   wherein the handle part is located above the head frame in the space when folded.

9. A folding structure for a two-wheeled vehicle, comprising:
   a front wheel and a rear wheel;
   one end of a head frame connected with the front wheel;
   one end of a first frame connected to the other end of the head frame;
   one end of a second frame connected to the other end of the first frame, and the other end of the second frame connected with the rear wheel;
   a first rotational shaft configured to rotate the head frame with respect to the first frame, the first rotational shaft being level with and parallel to the ground and intersecting a lengthwise direction of the head and the first frames, wherein the first rotational shaft is in a perpendicular direction to the first frame;
   a second rotational shaft configured to rotate the first frame with respect to the second frame, wherein the second rotational shaft is level with and parallel to the ground and in the perpendicular direction to the first and the second frames,
   wherein the first rotational shaft is located in an upper end of the first frame, and the second rotational shaft is located in lower ends of the first and the second frames,
   wherein a space is formed between the front and rear wheels when the front and rear wheels are opposite to each other by rotation of at least one of the first rotational shaft and the second rotational shaft, and
   wherein the front and rear wheels are spaced apart from each other when the front and rear wheels are opposite to each other by the rotation of the first frame and front wheel; and,
   a slide protrusion and slide groove located at the first rotational shaft or the second rotational shaft to regulate a distance of the space between the front and rear wheels in a folded configuration of the folding structure, wherein when the front and rear wheels are opposite to each other, the front wheel is beside the rear wheel the front wheel.

10. The folding structure of claim 9, wherein a rotary direction of the front and rear wheels are not changed when the front and rear wheels are opposite to each other.

11. The folding structure of claim 9, wherein the first rotational shaft has the same direction as rotational shafts of the front and rear wheels.

* * * * *